US012556865B2

(12) United States Patent
Lin et al.

(10) Patent No.: US 12,556,865 B2
(45) Date of Patent: Feb. 17, 2026

(54) HEADBAND AND A METHOD FOR PRODUCING THE HEADBAND

(71) Applicant: GN Audio A/S, Ballerup (DK)

(72) Inventors: Frank Lin, Ballerup (DK); Seven Huang, Ballerup (DK); Alice Lin, Ballerup (DK); Jon Grane Madsen, Ballerup (DK); Bill Zeng, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 683 days.

(21) Appl. No.: 18/047,540

(22) Filed: Oct. 18, 2022

(65) Prior Publication Data

US 2023/0066274 A1 Mar. 2, 2023

Related U.S. Application Data

(62) Division of application No. 17/454,401, filed on Nov. 10, 2021, now Pat. No. 11,689,857.

(30) Foreign Application Priority Data

Dec. 28, 2020 (CN) .......................... 202011582378.9

(51) Int. Cl.
*H04R 5/033* (2006.01)
(52) U.S. Cl.
CPC .................................. *H04R 5/0335* (2013.01)
(58) Field of Classification Search
CPC .............................. H04R 1/105; H04R 5/0335
See application file for complete search history.

(56) References Cited

U.S. PATENT DOCUMENTS

| 5,574,795 A | 11/1996 | Seki |
| 5,590,213 A | 12/1996 | Urella et al. |
| 11,689,857 B2 * | 6/2023 | Lin ...................... H04R 1/1066 |
| | | 381/370 |
| 2015/0139472 A1 | 5/2015 | Solomon et al. |
| 2017/0257695 A1 | 9/2017 | Smiechowski |
| 2018/0014973 A1 | 1/2018 | Echeverri et al. |

(Continued)

FOREIGN PATENT DOCUMENTS

| CN | 207518809 U | 6/2018 |
| CN | 211791960 | 10/2020 |
| WO | 1993006696 A1 | 4/1993 |

OTHER PUBLICATIONS

Extended European Search Report, dated Jun. 8, 2022, 7 pages, cited in corresponding European Patent Application No. 21213850.7.

(Continued)

*Primary Examiner* — Suhan Ni
(74) *Attorney, Agent, or Firm* — HSML P.C.

(57) ABSTRACT

A headband for a headset and a method for producing the headband for the headset is disclosed. The headband is configured to carry at least one earcup of the headset. The headband comprises a carrier and a rubber suspension formed by overmolding. The method comprising the steps of providing the carrier, arranging the carrier in an injection molding tool, and forming the suspension from a rubber material by overmolding such that the suspension forms at least two attachment points to the carrier.

8 Claims, 6 Drawing Sheets

(56) References Cited

U.S. PATENT DOCUMENTS

2018/0302703 A1 10/2018 Andrikowich et al.
2019/0208309 A1 7/2019 Clark et al.

OTHER PUBLICATIONS

Office Action issued in corresponding Chinese Application No. 202011582378.9, mailed Dec. 27, 2024, with English machine translation.
Examination Report issued in European Application No. 21213850.7, dated Mar. 14, 2024.

* cited by examiner

HEADBAND AND A METHOD FOR PRODUCING THE HEADBAND

FIELD

The present disclosure relates to a headband for a headset and a method for producing the same. The headband comprises a carrier and a rubber suspension formed by overmolding.

BACKGROUND

Headsets may be used in various settings and the users may be wearing the headsets during long time spans. Headsets users require a comfortable design, a good fit, as well as good stability of the headset. Also, most of the users desire lightweight and discrete headset. Therefore, it is desired to have a headset which provides a good overall fit with the user's head and, at the same time good comfort for the user. All these characteristics are mainly determined by a headband typically worn over the user's head. A number of different headbands are available on the market. Most of the available headbands have several pieces which allow users to adapt the headband to their own preferences. Having a headband with many separate pieces can be complex to use, movable parts are prone to wear, the user may not be able to achieve an optimal fit, assembly of such headbands can be complex and thereby expensive.

There is a need for an improved method of producing a headband as well as for a headband for a headset to overcome problems of the prior art.

SUMMARY

It is an object of embodiments of the present invention to provide an one-piece headband which fits all head sizes.

It is also an object of embodiments of the present invention to provide a headband with a simplified design compared to headbands known in the art.

It is a further object of embodiments of the present invention to provide a headband which is easy to manufacture.

It is a further object of embodiments of the present invention to provide a lightweight headband which thereby provides a great comfort to potential users.

In a first aspect, the invention discloses a method for producing a headband for a headset. The headband comprises a carrier and suspension. The headband is configured to carry at least one earcup of the headset. The method comprises the steps of providing the carrier and arranging the carrier in an injection molding tool. The method further comprises the step of forming the suspension from a rubber material by overmolding such that the suspension forms at least two attachment points to the carrier at a first suspension end and a second suspension end. The suspension forms a head pad extending between the first suspension end and the second suspension end.

In the present context, the term "headband" is to be interpreted to refer to a band to be worn over the user's head, and in particular over the top of the user's head while the ends of the headband may abut sides of the user's head, e.g. at the ear(s). In the following, the terms "user" and "wearer" may be used interchangeably about the person having the headset on his/her head.

The headband is suitable for a headset, and in particular for an over-the-head headset. In other words, the headband forms part of a headset. The headset, in addition to the headband, comprises an earcup carried by the headband. The engagement between the headband and the earcup can be established in various ways known in the art. The earcup is typically arranged at one end of the headband. The other end of the headband may comprise a stabilization element abutting a side of the user's head to ensure proper positioning of the headband and headset. The earcup defines an inner surface, typically for engagement against one of the ears of the user. The earcup may comprise various electronic elements necessary for a proper functioning of the headset, and in particular a speaker configured to generate a sound signal. Alternatively, the earcup may be a passive mechanical means configured to provide noise attenuation/cancellation. The headset may further comprise a microphone and/or another earcup to be arranged on the other ear of the user. The microphone may be arranged onto an earcup or, alternatively, directly on the headband. The microphone may be arranged on a microphone boom arm.

The headband of the present invention may be used for an audio headset, i.e. a headset used for audio purposes, and/or it may be used for a noise-attenuating headset which provides a passive noise attenuation capability.

The headband comprises a carrier and suspension. The carrier and suspension may form one piece. Namely, the carrier and suspension, may form an integral part and cannot be detached from each other in a non-destructive manner, i.e. without damaging the headband.

When producing the headband, at first, the carrier is provided. The carrier may generally be U-shaped having two ends and may exhibit flexible behaviour to ensure a fit to various head sizes in particular various head widths of potential users. The carrier may be made of a metal material, a plastic material, or even wood. The carrier may be machined by a machine, cast in a mold, or even hand made. Regardless of the material selection, the carrier may have a thickness and a width which provide good mechanical stability and flexibility at the same time. Furthermore, the carrier may be configured to provide a basic clamping force exerted to the head of the user. The basic clamping force is manipulated by controlling the thickness and cross section of the carrier. The provided carrier may be produced such that it has a very small variance and deviation from a modelled carrier.

Once provided, the carrier is arranged in an injection molding tool. The injection molding tool may comprise a mould for molding the suspension and thereby forming the headband. The mould may form a carrier cavity for placing the carrier and a suspension cavity for formation of the suspension. The carrier cavity may comprise at least two sub-cavities, a lower and upper form part, for formation portions which form connection between the suspension and the carrier. The sub-cavities may also be seen as part of the suspension cavity.

The injection molding tool may define a lower form part configured to receive the carrier of the headband. The tool may further comprise an insert and an upper form part. The insert may define attachment points and the pad and can be replaced with another insert so that different embodiments of the headband can be achieved. Namely, the insert may define the distance between the attachment points, thickness of the pad, separation between the carrier and the pad. The insert may also define whether the carrier is completely overmolded between the attachment points or it is overmolded only at the attachment points. The insert may define the suspension having a pad and where the carrier is completely encapsulated by the rubber material between the attachment points. Sharing a common lower and upper form part, and having interchangeable inserts minimizes the tooling fabrication needed, thereby reducing a tooling cost. Once the carrier is provided in the tool, the rubber material may be injected into the mold under high pressure to form the suspension. Once the rubber material solidifies, the tool can be opened and the headband can be removed from the tool.

The suspension is typically configured to rest at and abut the top of the user's head when the headband is in use thereby at least partially supporting the weight of the entire headset. The suspension may contribute to the basic clamping force generated by the carrier to fine tune it and in particular when the headband is fitted in place on the head. The suspension defines a headband padding which provides a secure fit of the headband and further ensures good wearing comfort, especially for long-term wearing comfort thanks to the rubber material which is soft and easy to stress and deform. By a careful selection of the rubber material used for the suspension and padding, wearing comfort can be drastically improved. Normally, soft rubbers are selected for overmolding. Soft rubbers normally have good processing characteristics as they are widely used for various applications. Therefore, manufacturing of the headband is simplified. As the suspension is made of the rubber material, when the user stretches the headband to fit it onto the head the suspension will adjust automatically to fit the head and to ensure good fit and comfort. The soft rubber material further allows for the padding of a relatively small thickness, e.g. any value between 2 mm and 10 mm, thus providing a headband which is not bulky and thereby not jeopardizing a headset design, appearance, and/or weight. However, in some embodiments, where bulkiness of the headband is not desired, the padding can be thicker than 10 mm, such as 20 mm, or even 30 mm, or anything between 10 mm and 30 mm. Any one of natural rubber, silicone rubber, polyurethane, or similar can be used in the overmolding process to form the suspension. Thanks to the soft rubber used for the suspension, the headband can easily be removed from the injection molding tool. The rubber material used for the suspension may easily be pigmented/colored so that it has the same color as the carrier. The rubber material used for the suspension may have a density in a range between 1 mg/mm$^3$ and 1.3 mg/mm$^3$, hardness in the range between 30 and 80 durometers shore A, tensile strength between 6 MPa and 11 MPa, elongation at break between 300% and 660%, tear strength angle between 20 kN/m and 32 kN7m, rebound resiliency between 50% and 70%, and compression set at 180° C. between 8% and 15%.

According to the invention, the headband is formed by overmolding rubber material onto the carrier which, in the present context, forms a substrate for the overmolding. The step of overmolding is an injection molding process in which the rubber material is in a liquid state and injected into the injection molding tool under high pressure and coats the substrate at two attachment points and at the same time forms the padding. Once the rubber hardens, the carrier and the suspension are permanently joined together as a single part and the whole structure can be removed from the molding tool. Prior to the overmolding, a layer of agent may be applied on the carrier to increase the bonding force between the carrier material and the rubber material. The carrier provides a desired rigidity to the headband while the suspension provides comfort for the user. It is an advantage of the present invention to form the suspension by overmolding the rubber material as the rubber material is easy to mold and as it is highly deformable.

Before the overmolding, the rubber material may be mixed with various additives like colorants, foaming agents, or other fillers, in order to achieve a mixture which will result in the suspension with a specific color and/or hardness.

The suspension forms at least two attachment points to the carrier at a first suspension end and a second suspension end. The two attachment points can be arranged at a distance equally spaced from a midpoint of the carrier. The midpoint is normally equidistant from both ends of the U-like shaped carrier. The attachment points may be arranged at 1-10 cm, such as 5-10 cm distance from the carrier midpoint. The attachment point may be defined by the user's requirements. Each attachment point may be defined by its width which may range from only several millimetres and up to 5 centimetres. By arranging the attachment points symmetrically around the midpoint of the carrier, stability of the headband arranged onto the head of the user can be improved. Apart from the first suspension end and second suspension end formed at the attachment points, the suspension also comprises a head pad which extends between the first and second suspension end. The pad is also formed by overmolding at the same time and in the same process step when the first and second ends are formed, and naturally, from the same rubber material.

In order to form the suspension which attaches to the carrier only at two attachment points, the injection molding tool may comprise a very narrow cavity designed to receive the carrier only. Namely the cavity for receiving the carrier may be so narrow that no rubber material can float into apart from the two small cavities for formation of the attachment points. Alternatively or additionally, the carrier may be covered, so that no rubber material can cover the carrier except from at the attachment points. The suspension, including the points where it is attached to the carrier, is overmolded. Thus, in the broadest context, only the two points of the carrier, where the suspension is attached, will be overmolded.

Having the headband formed by a rubber-to-carrier overmolding one-piece headband which fits all head sizes is provided. Such a headband provides a simplified design compared to most headbands known in the art. One-size headband is a user-friendly design as it does not require the user to adapt the size of the headband to ensure a good fit. The headband according to the present invention is easy to manufacture as it requires only two different materials and a few steps of making the carrier and then arranging it in the tool for overmolding. Such a simple manufacturing saves manufacturing time as there is no need for further assembling steps in a product line. By careful design and choice of the carrier, the present invention provides a lightweight headband with a soft padding which thereby provides a great comfort to potential users. Simultaneously, an elegant design, normally desired by a majority of users, is achieved. Additionally, the headband according to the present invention provides a uniform clamping force uniformly distributed over the user's ears and the top of the head achieved by the carrier and suspension design. The headband is therefore easy to use as the user does not have to adjust the tightness of the headband all the time. Furthermore, a precise geometry is achieved by overmolding as the high pressure of injections ensures that the rubber material reaches even the smallest crevice of the mould to thereby create the headband according to a predefined form. Finally, having a suspended pad as a part of the headband provides a headband in which a pressure to the user's head is uniformly distributed along the contact between the user's head and the headband.

In some embodiments, overmolding the rubber material around the carrier is performed in one process step. Namely, once the carrier is arranged in the injection molding tool, the liquid rubber material is injected under controlled high pressure into an entrance of the mold at once. The high pressure pushes forward the liquid rubber material such that cavities filled by the rubber material are completely filled up defining the suspension. The molding tool may have one or more gates representing entrances for the rubber material into the tool. The rubber material may be injected at all entrances at the same time. Injecting the rubber material into the molding tool in one process step ensures even solidification of the suspension, i.e. each portion of the suspension will have same time for solidification. Also, having only one step of overmolding drastically reduces the manufacturing complexity of the headband. In the overmolding process, adhesion between the carrier material and rubber material occurs and results from the fact that, while filling the cavities of the mold, the liquid rubber material impregnates the top layer of the carrier to such an extent as to mechanically fix the particles of the carrier and rubber after the rubber solidifies thereby forming an integral, one-piece headband. Once solidification is complete, the molding tool opens and the headband is ejected or can be removed manually.

In some embodiments, the method for producing a headband may further comprise a step of molding at least one telescopic extension for the headband. The telescopic extension may be formed by injection molding. The telescopic extension may be manufactured separately from the overmolded carrier. The telescopic extension may extend longitudinally and have a generally circular cross section. The telescopic extension may have a longitudinal hole configured to receive one end of the carrier. The hole may extend through the entire telescopic extension or it may extend through only a portion of it, such as one third of the length. The telescopic extension may be a sleeve-like unit configured to be slid over the carrier. The telescopic extension provides an additional adjustability to the headband such that it can provide better comfort for different head sizes, lengths, and widths as the telescopic extension could also help if the user has a very wide head.

In some embodiments, a method for producing a headband for a headset may further comprise a step of assembling the at least one telescopic extension onto the headband. The sleeve-like extension may be movably arranged onto one arm of the U-shaped carrier. The extension may be movable along the arm of the U-shaped carrier. The earcup may be arranged onto the extension. The carrier may have extensions arranged on both arms of the U-shaped carrier.

In some embodiments, overmolding the rubber material around the carrier may comprise overmolding the rubber material around the carrier to form the two attachment points and providing the head pad spaced from the carrier. Providing the attachment points and head pad between these may be performed in one injection step. The rubber material may encase the carrier at the attachment points and the attachment points may gradually change into the pad. The head pad may be configured to rest on the wearer's head while a portion of the carrier between the two attachment points is configured to hover over the head pad and the wearer's head when the headband/headset is worn in its intended position. The spacing formed between the pad and the carrier may exist when the headband is not in use. When the headband is in use, the pad may come closer to the carrier as it may be pushed by the head of the user such that the spacing does not exist any longer. Having the pad spaced from the carrier provides additional comfort for the user. The spacing may be in the range between a few millimetres and two centimetres. Alternatively, the pad may abut the carrier even when the headband is not in use. The headband will also in this embodiment provide comfort to the user, thanks to the soft rubber used for the suspension. In this embodiment, the thickness of the pad may be slightly larger than compared to the thickness of the pad spaced from the carrier.

In some embodiments, the suspension may be overmolded around at least a portion of the carrier to completely encapsulate the portion of carrier. Namely, the attachment points and the pad may not be separated, but the rubber material may be wrapped around a portion of the carrier, and in particular the portion which is configured to hover over the top of the user's head. Alternatively, the entire carrier may be encapsulated into the rubber material. In yet one alternative, the rubber material may be overmolded only on the bottom side of the carrier, i.e. the side facing the user's head when the headband is in its intended position on the user's head. In all these embodiments, the pad may be created, i.e. there may be a portion of the rubber material which is thicker than the rest. This portion would be positioned around the top of the user's head when the headband is in use. Overmolding the rubber material around the carrier makes a more solid construction, which cannot delaminate as it normally happens with a number of other headbands in the art.

In a second aspect, disclosed is a headband for a headset produced by the method described above. It should be understood that all the embodiments, benefits and advantages described in connection with the first aspect are equally relevant for this second aspect.

In a third aspect of the invention, disclosed is a headband for a headset, the headband is configured to carry at least one earcup of the headset. The headband comprises a carrier and a suspension. The carrier is curved to approximately conform to any wearer's head. The suspension is formed from a rubber material by overmolding. The suspension is attached to the carrier at at least two attachment points. The suspension forms a head pad. The carrier may be deformed elastically in order to adapt to the user's head and ears. It should be understood that all the embodiments, benefits and advantages described in connection with the first aspect are equally relevant for this third aspect.

The carrier may be made of metal, hard plastics, and wood. In particular metal carrier with overmolded rubber provides a headband which can stretch to fit different width of human head sizes. The headband can mainly stretch in an x-direction, i.e. parallel with a line connecting the user's ears, e.g. an ear-to-ear (E2E) direction through the head. The soft rubber padding can automatically fit a human head and can be deformed vertically to thereby provide good wearing comfort and secure fit.

In some embodiments, the carrier and the suspension may contribute to a clamping force of the headband. The clamping force relates to a level of tightness of the headband. The clamping force also relates to the amount of pressure exerted by the headband against the user's head. The clamping force ensures a good overall fit and engagement of the headband and also a tight fit of the corresponding headset. The carrier may provide a main clamping force while the suspension contributes by fine tuning the main clamping force. The basic clamping force can be uniformly distributed along the carrier. The clamping force may also be uniformly distributed along the headband. The headband according to the present invention may fit all head sizes of adult users mainly due to the uniformly distributed clamping force. It is however possible to adjust the ratchet length of the carrier and thereby change the length of the carrier. By adjusting the ratchet length different opening distances of the headband can be achieved and thereby different clamping forces. The longer flexible lengths would fit wider heads thereby achieving the appropriate clamping force level. In some embodiments, it is desired that only the carrier contributes to the clamping force. Typically, the more complex the suspension design is and the more rubber material is overmolded on the carrier, the more does the clamping force depend also on the suspension in addition to the basic carrier clamping force. By placing the rubber material only on the outer surface of the carrier, and given that the rubber extension rate is very high so that it can follow deformations of the carrier, impact of the suspension on the overall clamping force is decreased. In solutions known in the art, a number of separate parts all contribute to the clamping force of a headband resulting in a non-uniform clamping force.

In some embodiments, the suspension may comprise a first rubber material part and a second rubber material part. The first rubber material part may form the attachment points. The second rubber material part may be spaced from the first rubber material part. The second rubber material part may be configured to rest on the wearer's head when the headband/headset is worn in its intended position on the user's head. The first rubber material part may be configured to hover over the second rubber material part and the wearer's head when the headband/headset is worn in its intended position on the user's head. The first rubber material part may be formed only on the top side of the carrier and between the attachment points. Alternatively, the first rubber material part may be formed only on the bottom side of the carrier facing the second rubber material part and between the attachment points encasing the carrier. In yet one alternative, the first rubber material part may encapsulate a portion of the carrier between the two attachment points. The second rubber material part may form the pad of the headband. Having the suspension with a pad provides excellent wearing comfort, especially for long term use. Such a headband can provide a soft padding of only 2-10 mm thickness thereby providing a comfortable, lightweight headband looking slim and neat. Such design provides a number of improvements compared to traditional bulky design normally resulting in a heavy headband.

In some embodiments, the headband may further comprise at least one telescopic extension slideably arranged onto one end of the headband. The telescopic extension is arranged on the headband in order to allow adjustments of the headband to accommodate different head sizes, both in width and length. The telescopic extensions may additionally contribute to the clamping force of the entire headband. The earcup(s) may be arranged on the telescopic extension (s). Thereby, the telescopic extension(s) permits the user to properly position the earcup(s) with respect to the user's ears. The telescopic extension may define a pivoting portion onto which a microphone may be arranged.

In some embodiments, the at least one telescopic extension may be arranged onto the headband by means of a hook. Alternatively, a spring can be provided for fixing the telescopic extension to the metal/rubber. The telescopic extension may also be arranged to the carrier by providing a groove in the carrier and a corresponding protrusion on the extension to fit the groove. The extension may be arranged onto the carrier by a snap fit. The telescopic extension may be removably arranged on the headband. The user may be able to manipulate it in order to achieve the best possible fit of the headband according to a current use. The user may also be able to remove the extension if he/she does not need it.

The second rubber material part may have a concave cross-section shape facing towards the first rubber part. The concave shape of the padding towards the carrier allows for material reduction used for the padding. Additionally, such shape improves flexibility and deformability of the padding. The concave shape will also provide a strength of the suspension itself as such bridge-like shape is less prone to the gravity. The face of the second rubber part pointing towards the user's head may be convex in cross-section. The convex shape improves wearing comfort as no sharp edges may cause discomfort. Also, the convex shape ensures that the pressure of the headband exerted to the wearer's head is uniformly distributed over the surface of the padding.

In some embodiments, the headband for a headset may further comprise a headphone unit and an electrical cable attached to the carrier, the electrical cable being configured for electrically connecting the headphone unit and the earcup. The headphone unit may comprise a microphone. The unit may be arranged on the same side of the headband as the earcup. Otherwise it can be arranged on the other end of the headband and possibly together with another earcup. The cable may also electrically connect two earcups arranged on two ends of the headband, thereby forming a stereo headset. The cable may be attached to the carrier prior to the step of forming the suspension by overmolding. The cable may be attached to the carrier by gluing. Alternatively a pin or similar may be used for attaching the cable to the carrier. When the rubber material is overmolded to form the suspension, the portions formed around the attachments points may additionally affix the cable to the carrier. Alternatively, the rubber material may be overmolded over a larger portion of the carrier, e.g. to form a continuous structure from one attachment point to another and thereby encapsulate the cable between the carrier and the rubber overmolded over a portion of the carrier. In yet one alternative, the rubber material may completely encapsulate the cable such that it is not visible on the final headband. The cable may be arranged either on an inner side of the carrier, facing the head of the user, or it can be arranged on an outer side of the carrier, further away of the user's hear, when the headband is worn by the user.

The carrier may be a metal carrier. Any metal can be used as a carrier, such as aluminium, copper, iron, tin, gold, lead, silver, titanium, zinc, etc. Additionally, metal alloys, such as steel, can also be used. The carrier may be a cold rolled stainless steel strip. The metal carrier may be formed in a bended shape, such as U-like shaped. The metal U-shaped carrier may be flexible. Having a metal carrier provides sufficient rigidity and robustness to the headband, and since the metal machining is well established, the carrier can be properly designed and shaped to exhibit a desired clamping force. Furthermore, metal is suitable for overmolding with a rubber material.

The carrier may also be cast from any hard plastics which can be bended and which can be flexible. The plastics carrier may be formed by injection molding using one mold and then the substrate can be formed by overmolding in another injection molding tool. Thermoplastics which are softened by heat and can be moulded may be used. Thermoplastic carrier may be shaped by injection moulding, blow moulding, or vacuum formation. Examples of thermoplastics are acrylic, polypropylene, polystyrene, polythene and PVC. The carrier may further be made of thermosets, such as melamine, bakelite, polyester, and epoxy resins which are formed by heat process.

The carrier may also be made of composites made by mixing materials together to get enhanced properties. Polyester resin may be mixed with glass fibre, epoxy resin may be mixed with carbon fibre to achieve a carrier which is stronger than steel but lighter.

The carrier may further be made of acrylic, PVC and uPVC, polythene, high-density polyethylene (HDPE) and a low-density grade polyethylene (LDPE) which is tough and flexible.

The carrier may be provided in a form of a bended strip. The carrier may have a thickness in the range between 0.5 mm and 5 mm. The carrier may have a width in the range between 1 cm and 3 cm. The carrier may have a total length in the range between 10 cm and 30 cm. The carrier may have a yield strength in the range between 500 Mpa and 1000 Mpa. The carrier may have a tensile strength in the range between 1000 Mpn and 1500 Mpn. The carrier may have a hardness in the range between 400 HV and 500 HV.

In a preferred embodiment, the carrier is made of a metal and the suspension is made of a silicon rubber. In other embodiments, the carrier may be made of a hard plastic, such as LDPE and the suspension may be made of a soft rubbers, such as silicon rubber.

The present invention relates to different aspects including the method for producing a headband described above and in the following, and a corresponding headband produced by the method, as well as a headband, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
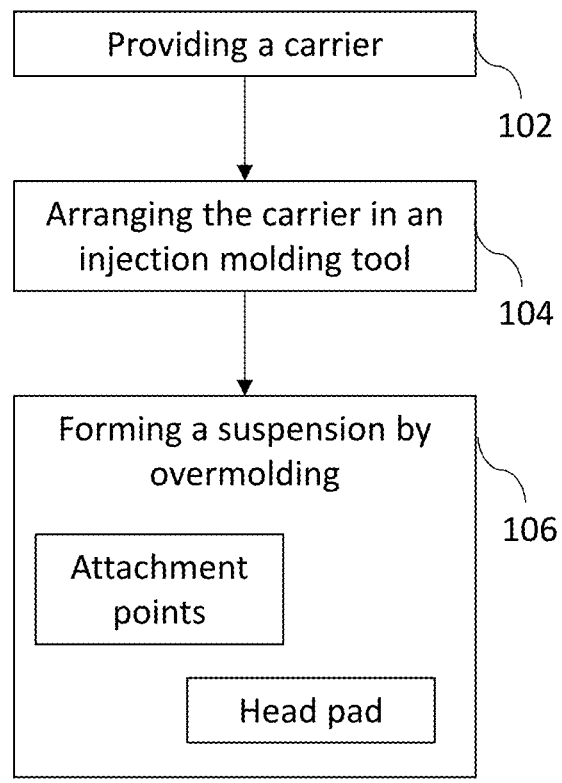
FIG. 1 illustrates an exemplary embodiment of a method for producing a headband for a headset according to the present invention, FIG. 2 schematically illustrates an injection molding tool and formation of a headband according to embodiments of the present invention, FIG. 3 schematically illustrates an exemplary embodiment of a headband for a headset according to the present invention, FIG. 4 schematically illustrates another exemplary embodiment of the headband for a headset according to the present invention, FIG. 5 schematically illustrates yet one exemplary embodiment of the headband for a headset according to the present invention, and FIG. 6 schematically illustrates a headphones having a headband according to an embodiment of the present invention.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

FIG. 1 illustrates an exemplary embodiment of a method 100 for producing a headband for a headset according to the present invention. The headband comprises a carrier and suspension. The headband is configured to carry at least one earcup of the headset. The method 100 for producing the headband for a headset comprises the step 102 of providing the carrier. The method then comprises the step 104 of arranging the carrier in an injection molding tool. Finally, the method comprises the step 106 of forming the suspension by overmolding during which at least two attachment points between the suspension and the carrier are created as well as a head pad. The suspension is formed from a rubber material. The attachment points are formed at a first suspension end and at a second suspension end. The head pad extends between the first suspension end and the second suspension end.

Figure 2:
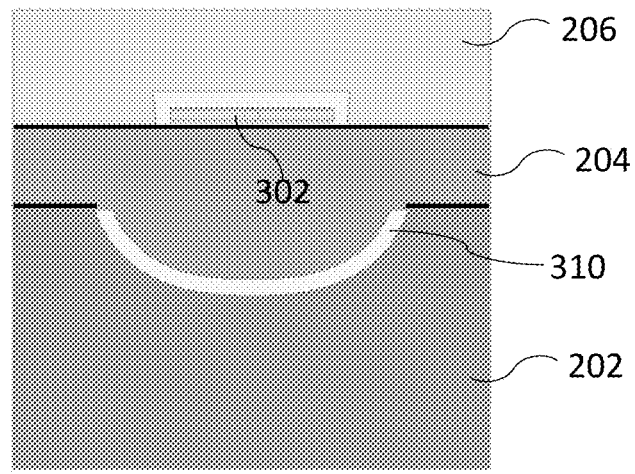
Figure 2:
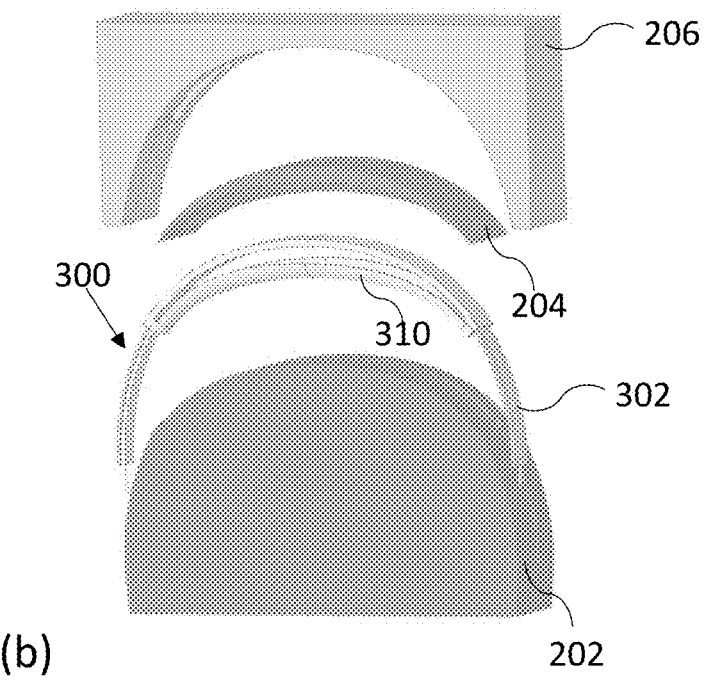

FIGS. 2(a) and 2(b) schematically illustrate an injection molding tool 200 and formation of a headband according to embodiments of the present invention in a compact view (a) and in an exploded view (b). The injection molding tool 200 defines a lower form part 202 configured to receive a carrier of the headband. The tool further comprises an insert 204 and an upper form part 206. The insert 204 may define attachment points and the pad and can be replaced with another insert so that different embodiments of the headband can be achieved. Namely, the insert 204 may define the distance between the attachment points, thickness of the pad, separation between the carrier 302 and the pad 310. The insert 204 may also define whether the carrier is completely overmolded between the attachment points or it is overmolded only at the attachment points. The insert 204 illustrated in FIG. 2 defines the suspension having a pad 310 and where the carrier 302 is completely encapsulated by the rubber material between the attachment points. Sharing a common lower form part 202 and upper form part 206, and having interchangeable inserts minimizes the tooling fabrication needed, thereby reducing a tooling cost. Once the carrier 302 is provided in the tool, the rubber material is injected into the mold under high pressure to form the suspension. Once the rubber material solidifies, the tool 200 can be opened and the headband 300 can be removed from the tool 200. Separated pieces of the molding tool 200 can be seen in FIG. 2(b) showing the exploded view as well as the headband 300 according to one of the embodiments of the invention.

Figure 3:
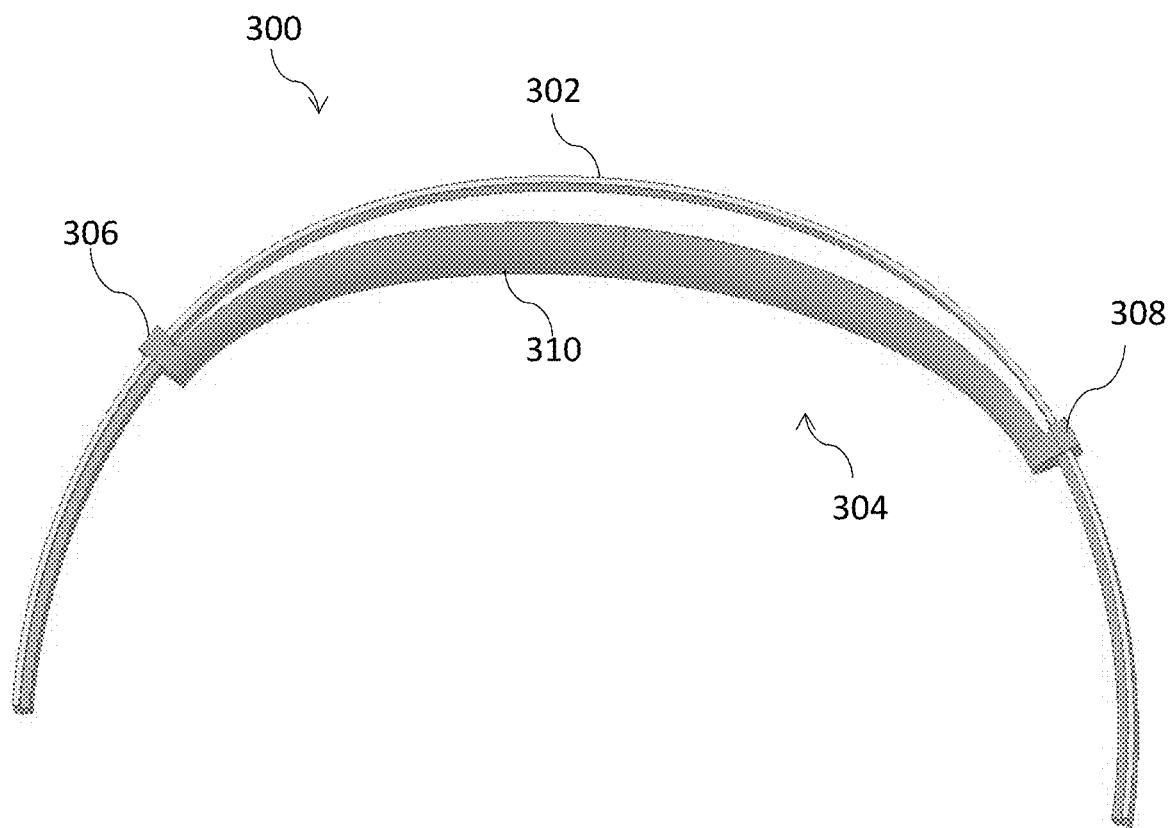

FIG. 3 schematically illustrates an exemplary embodiment of a headband 300 for a headset according to the present invention. The headband 300 for a headset is configured to carry at least one earcup of the headset (not shown). The headband 300 comprises a carrier 302 curved to conform to any wearer's head. It further comprises a suspension 304. The suspension 304 is formed from a rubber material by overmolding. The suspension 304 is attached to the carrier 302 at at least two attachment points 306 and 308. The suspension 304 forms a head pad 310. The carrier 302 may be U-like shaped.

Figure 4:
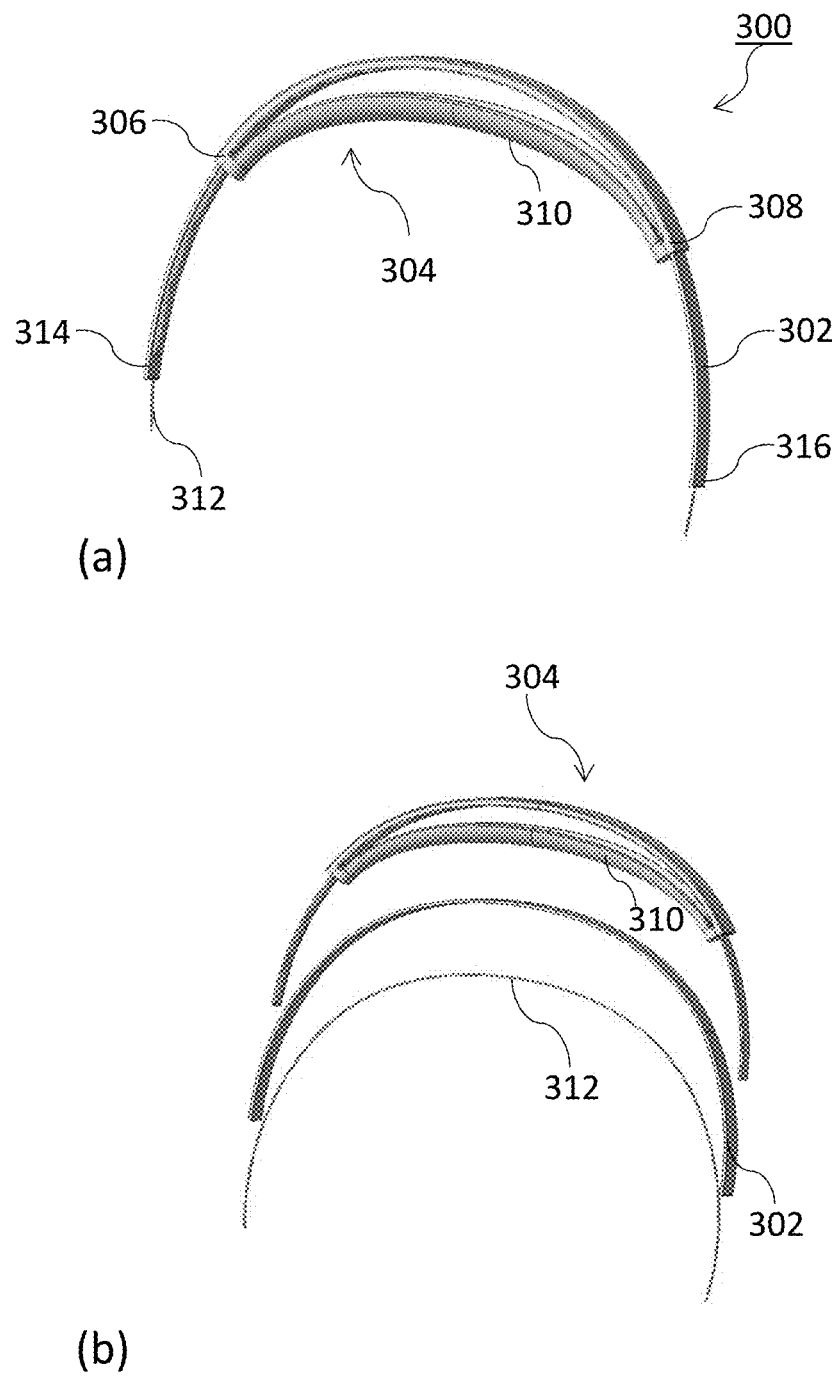

FIGS. 4(a) and 4(b) schematically illustrate another exemplary embodiment of the headband 300 for a headset according to the present invention. The headband 300 is shown in a compact (a) and an exploded (b) view. According to this embodiment, the headband comprises a carrier 302 to which an electrical cable 312 is attached. The electrical cable 312 is configured for electrically connecting earcups (not shown) which can be arranged on two ends of the carrier 302, resulting in a stereo headset. The electrical cable 312 may also be configured to connect a headphone unit and an earcup (not shown) arranged on the ends of the carrier 302. The cable 312 may be attached to the carrier 302 prior to the step of forming the suspension 304 by overmolding. The cable 312 may be attached to the carrier 302 by gluing. When the rubber material is overmolded to form the suspension 304, the portions formed around the attachments points 306 and 308 may additionally affix the cable to the carrier. The embodiment illustrated in FIG. 4 discloses the rubber material overmolded over a larger portion of the carrier 302, thereby forming a continuous structure from one attachment point 306 to another 308 which encapsulates the cable between the carrier 302 and the rubber overmolded over a portion of the carrier as well as securing the cable 312 on the inner portions of the carrier 302 extending from the attachment point 306 to one end 314 of the carrier 302 and from the attachment point 308 to the other end 316 of the carrier 302. In this embodiment, the rubber material completely encapsulates the cable such that it is not visible on the final headsets as the ends visible on FIG. 4a will be connected to earcups/headphone unit/microphone. In this embodiment, the cable 312 is arranged on the inner side of the carrier, facing the head of the user. In an alternative embodiment, the cable 312 can be arranged on an outer side of the carrier 302, further away of the user's hear, when the headband is worn by the user.

According to the embodiment shown in FIG. 4, head pad 310 has a concave shape seen in cross-section facing towards the carrier 302, and in particular facing the part of the carrier 302 which hovers over the head pad 310. The concave shape of the padding towards the carrier allows for material reduction used for the padding, improves flexibility and deformability of the pad 310. The opposite side of the head pad 310 facing towards the user's head (when the headband is placed over the user's head) is convex. The convex shape improves wearing comfort as the pressure of the headband 300 exerted to the wearer's head is uniformly distributed over the surface of the head pad 310. The head pad 310 may be both longer and shorter than illustrated in the embodiment of FIG. 4. The length of the pad is determined by the spacing between the attachment points 306 and 308. This spacing can be manipulated by using different inserts of the insert molding tool.

Figure 5:
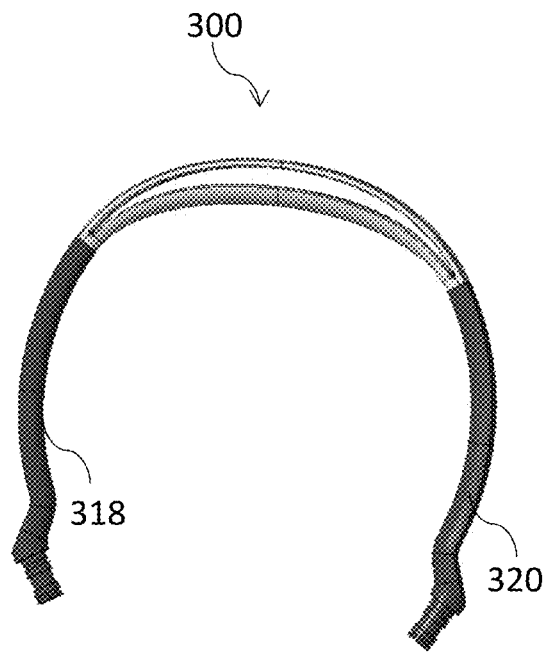

FIG. 5 schematically illustrates yet one exemplary embodiment of the headband 300 for a headset according to the present invention. In this embodiment, apart from the features described in connection to FIG. 4, the headband 300 further comprises two telescopic extensions 318 and 320 arranged on two ends 314 and 316 of the carrier. The telescopic extensions may be formed by injection molding and may be manufactured separately from the overmolded carrier. The telescopic extensions 318 and 320 illustrated in FIG. 5 are sleeve-like units configured to be slid over the carrier. The telescopic extensions 318 and 320 provide an additional adjustability to the headband such that it can provide better comfort for different head sizes, lengths, and widths as the extensions can be movably arranged onto the arms of the U-shaped carrier. Earcups, headphone units, and/or microphones may be arranged onto the extensions 318, 320. In some other embodiments, the carrier may have only one extension arranged on one of the arms of the U-shaped carrier.

Figure 6:
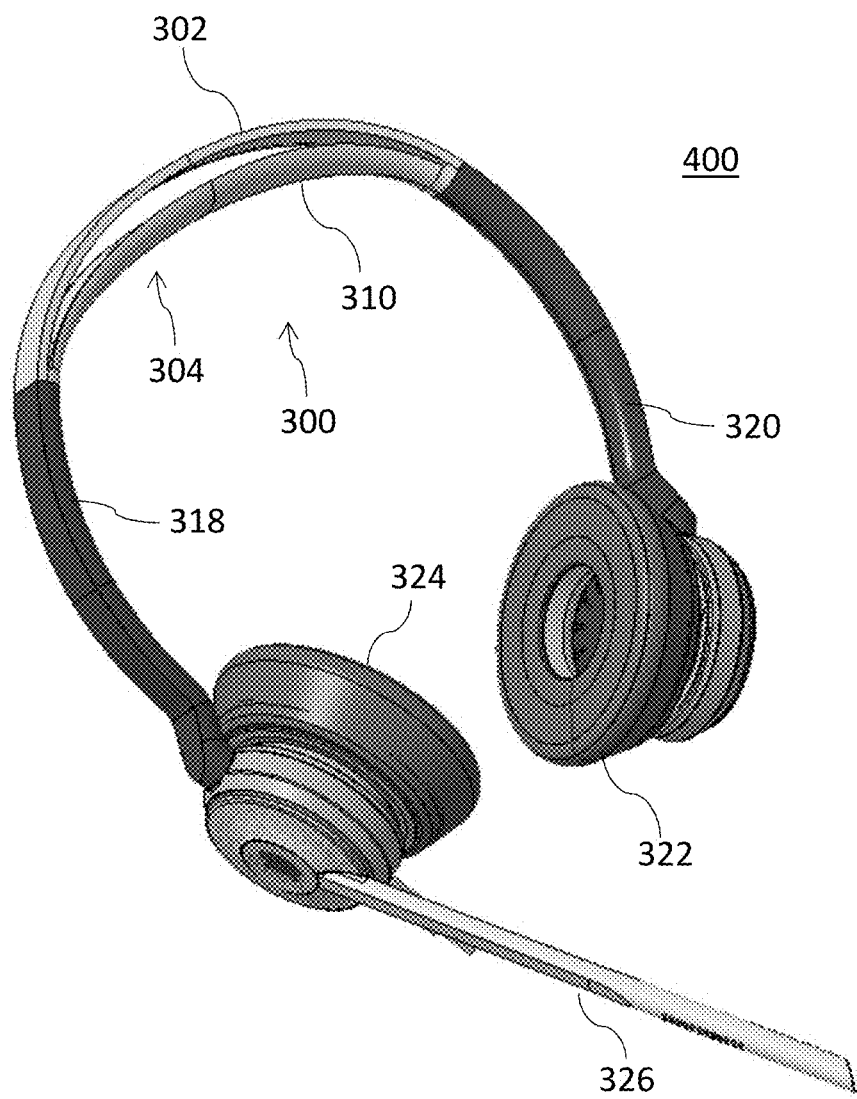

FIG. 6 schematically illustrates a headphones 400 having a headband 300 according to an embodiment of the present invention. The headphones 400 comprise a headband 300 as described in connection to FIGS. 4 and 5. The headband 300 is defined by the carrier 302 overmolded by the rubber material which defines the head pad 310. The headband of this embodiment further comprises telescopic extensions 318, 320 onto which earcups 322 and 324 are arranged. One of the earcups 324 has a boom microphone 326 arranged thereto. It will be understood by the skilled person that various combinations of earcups, microphones and telescopic extensions can be applied.

Additionally, another form of suspension 304 can also be used for the headphones 400 illustrated in FIG. 6. In particular, the suspension illustrated in FIG. 3 can be used.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

LIST OF REFERENCES 100 method for producing a headband
102 providing a carrier
104 arranging the carrier in an injection molding tool
106 forming a suspension
200 injection molding tool
202 lower form part of an injection molding tool
204 insert of an injection molding tool
206 upper form part of an injection molding tool
300 headband
302 carrier
304 suspension
306 attachment point
308 attachment point
310 head pad
312 electrical cable
314 carrier end
316 carrier end
318 telescopic extension
320 telescopic extension
322 earcup
324 earcup
326 microphone
400 headphones

The invention claimed is:

1. A headband for a headset, the headband being configured to carry at least one earcup of the headset, the headband comprising:
   a carrier curved to conform to any wearer's head; and
   a suspension,
      wherein the suspension is formed from a rubber material by overmolding, and the suspension is attached to the carrier at at least two attachment points formed at a first suspension end and a second suspension end,
      wherein the suspension forms a head pad that extends between the first suspension end and the second suspension end and is configured to rest at and abut the wearer's head at a top portion when the headband is in use, wherein further the head pad is formed by overmolding simultaneous with the suspension, and wherein the two attachment points are arranged at an equally spaced distance from a midpoint of the carrier.

2. A headband for a headset according to claim 1, wherein the carrier and the suspension contribute to a clamping force of the headband.

3. A headband for a headset according to claim 1, wherein the suspension comprises:

a first rubber material part; and a second rubber material part, wherein the first rubber material part forming the attachment points, the second rubber material part being spaced from the first rubber material part, the second rubber material part being configured to rest on the wearer's head, and the first rubber material part is configured to hover over the second rubber material part and the wearer's head.

4. A headband for a headset according to claim 3, wherein the headband further comprises at least one telescopic extension slideably arranged onto one end of the headband.

5. A headband for a headset according to claim 4, wherein the at least one telescopic extension is arranged onto the headband by means of a hook.

6. A headband according to claim 3, wherein the second rubber material part has a concave shape seen in cross-section facing towards the first rubber part.

7. A headband for a headset according to claim 1, further comprising:

a headphone unit; and an electrical cable attached to the carrier, wherein the electrical cable is configured for electrically connecting the headphone unit and the earcup.

8. A headband for a headset according to claim 1, wherein the carrier is a metal carrier formed in a bended shape.

* * * * *